United States Patent
Stephenson

[11] 3,874,694
[45] Apr. 1, 1975

[54] UNITARY TONGUE INFLATOR FOR INFLATABLE RESTRAINT

[75] Inventor: Robert L. Stephenson, Sterling Heights, Mich.

[73] Assignee: Allied Chemical Corporation, New York, N.Y.

[22] Filed: Dec. 11, 1972

[21] Appl. No.: 314,046

[52] U.S. Cl............. 280/150 AB, 9/316, 180/82 C, 200/61.58 B, 280/150 SB, 307/10 SB, 340/52 E
[51] Int. Cl......................... B60r 21/08, B60r 21/10
[58] Field of Search............... 280/150 AB, 150 SB; 180/82 C; 340/52 E; 307/10 SB; 200/61.58 B; 9/316

[56] References Cited
UNITED STATES PATENTS

| | | | |
|---|---|---|---|
| 1,609,677 | 12/1926 | Waimel | 9/316 |
| 2,084,636 | 6/1937 | Fromm | 9/316 |
| 2,165,300 | 7/1939 | Peterson | 9/316 |
| 3,112,467 | 11/1963 | Benning | 340/52 E |
| 3,340,523 | 9/1967 | Whitman | 200/61.58 B |
| 3,437,993 | 4/1969 | Recio | 180/82 C |
| 3,624,601 | 11/1971 | Routzahn | 200/61.58 B |
| 3,672,699 | 6/1972 | De Windt | 180/102 |
| 3,674,059 | 7/1972 | Stephenson | 280/150 AB |
| 3,675,942 | 7/1972 | Huber | 280/150 AB |
| 3,682,498 | 8/1972 | Rutzki | 280/150 AB |
| 3,791,670 | 2/1974 | Lucore | 280/150 AB |

Primary Examiner—David Schonberg
Assistant Examiner—John P. Silverstrim
Attorney, Agent, or Firm—Jonathan Plaut

[57] ABSTRACT

A safety restraint for use in a vehicle, comprising an inflatable band assembly having a fastening device for positioning the band about an individual. The fastening device includes a rigid unitary tongue attached to the inflatable band, said tongue adapted for locking engagement with a buckle anchored to the vehicle, and said tongue having a chamber integrated therewith containing a source of pressurized gas in communication with the inflatable band. The source of pressurized gas includes electrical means for releasing the gas, said electrical means being placed in a circuit for activation by a sensing device responsive to crash conditions, by the act of engaging the tongue in the buckle. Inflation of the band therefore cannot occur unless the band is positioned about the individual.

6 Claims, 14 Drawing Figures

UNITARY TONGUE INFLATOR FOR INFLATABLE RESTRAINT

BACKGROUND OF THE INVENTION

1. Field of the Invention

This invention relates to vehicle safety systems, and more particularly to restraints having inflatable sections adapted to protect the wearer if the vehicle is involved in a collision.

2. Description of the Prior Art

Safety restraints for use in a vehicle, comprising inflatable band assemblies which inflate to protect the wearer riding in a vehicle involved in a collision at the moment of impact, have been suggested. Such systems may include a sensing device to initiate release of pressurized gas to the inflatable bands in response to conditions or forces which develop during a crash. In many of these systems the conduit supplying the gas to the band is connected to the band simultaneously with the act of "buckling up," and is disconnected as the band is unbuckled.

The repetitious act of connecting and disconnecting the inflatable band from the source of pressurized gas can lead to poor connections and consequently to the development of leaks. Furthermore, the need for precisely aligning the conduits, even when conveniently tapered, requires more time and care than does the insertion of an ordinary tongue into a band buckle.

SUMMARY OF THE INVENTION

The present invention is directed to a vehicle inflatable band assembly having a fastening device for positioning the band about an individual, comprising a rigid, unitary tongue attached to the inflatable band, adapted for locking engagement with a band buckle. The tongue has incorporated in its structure a chamber containing a source of pressurized gas in communication with the inflatable band, but separated therefrom by a rupturable partition. The source of pressurized gas includes means responsive to an electrical impulse for releasing the gas to the inflatable band and the tongue has electrical conductors connected to the means responsive to an electrical impulse. These conductors engage corresponding conductors in the buckle, to bring the source of pressurized gas into an electric circuit, which includes a source of electrical energy, and a sensing device adapted to close the electric circuit in response to abnormal conditions which tend to violently displace an individual in the vehicle from his seat. In consequence, when such abnormal conditions develop, and the safety band is positioned about the individual, the band will inflate.

Figure 1:
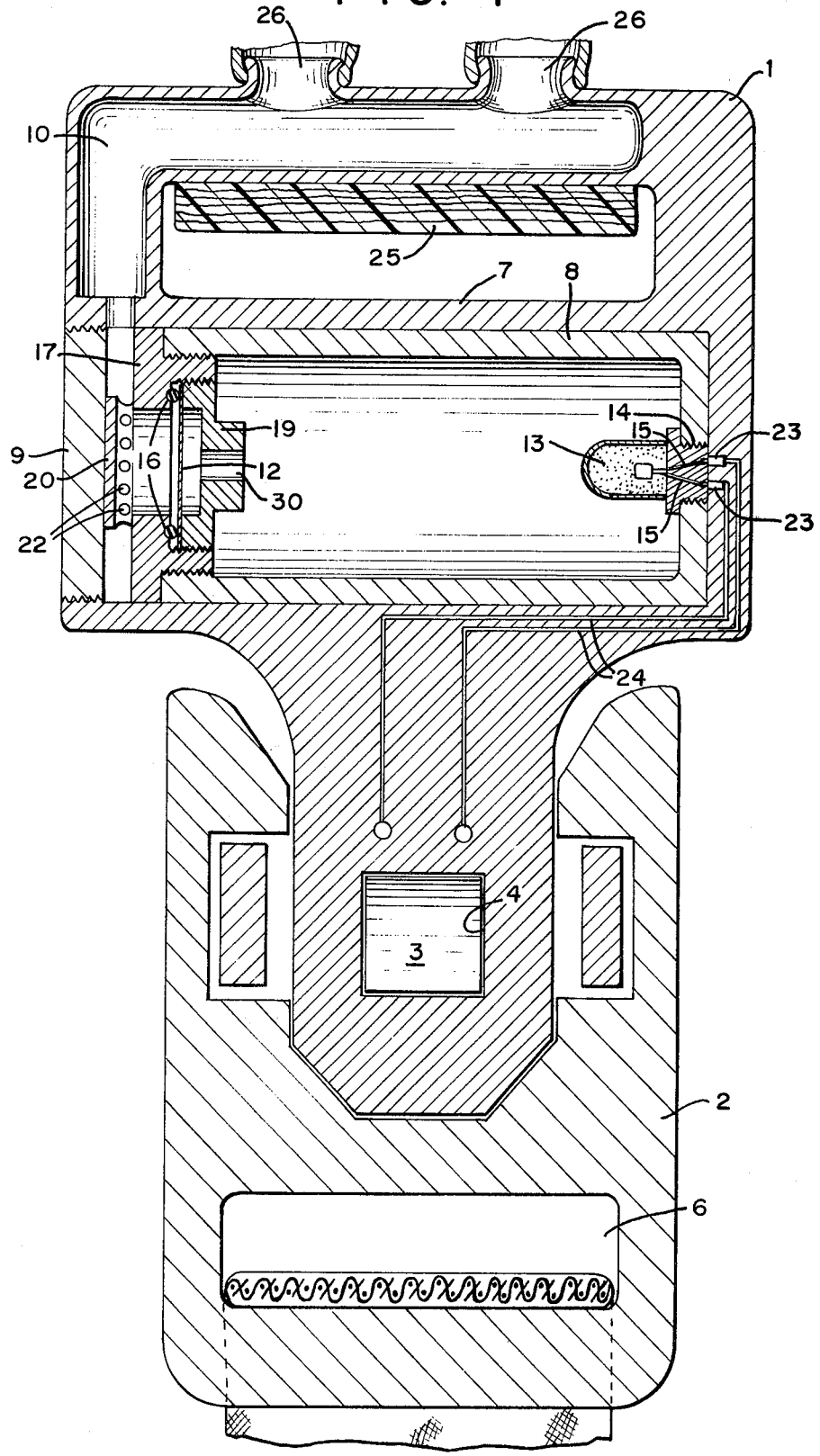
FIG. 1 is an enlarged cross-sectional view of the preferred embodiment of my invention, comprising a unitary tongue integrated with a source of pressurized gas, means for attaching an inflatable band to the tongue, and conduit and outlets for conveying the pressurized gas to the inflatable bands. In this view the tongue is in locked engagement with a buckle.

Also shown are two secondary circuits tied in with the primary circuit, to provide a signal when the ignition switch is on, an individual is seated within the vehicle, and the restraining band has not been positioned about the individual.

DETAILED DESCRIPTION OF THE INVENTION

In the vehicle inflatable band assembly of the present invention, the preferred embodiment includes a rigid, unitary tongue for fastening an inflatable band assembly comprising a flat, substantially rectangular portion for insertion into a band buckle, and having at least one slot therein for locking engagement with a latching member within the buckle. The slot may consist of one or more openings in the tongue, or notches in the edges of the tongue. The tongue has electrical conductors for connection with corresponding conductors within the buckle. The portion of the tongue extending from the buckle is enlarged, forming a compartment open at one end for the insertion of a pressurized cylinder, said compartment preferably having at its closed end, electrical recepticals comprising an electric socket, connected with the conductors. These electrical recepticals are adapted to receive rigid leads extending from the pressurized chamber in electrical contact. These rigid leads extending from the pressurized chamber are connected to means for releasing the pressurized gas within, and are responsive to an electrical impulse. Various means may be employed to release the gas. One such means, which is preferred, is an electrically detonatable squib comprising a fuse wire surrounded by an explosive or rapidly burning charge to produce heat. The compartment containing the electrical recepticals which is incorporated into the structure of the unitary tongue, and into which the pressurized chamber is inserted, has a closure, preferably threaded, to screw into the compartment. The compartment snuggly contains the pressurized chamber which is preferably held firmly in place by contact with the under surface of the closure. The unitary tongue also has conduit extending from a passageway in the pressure chamber to nipple outlets for attachment to the inflatable bands. Within the passageway is interposed a closure, preferably a rupture disc for normally retaining the gas in the pressure chamber. The conduit preferably consists of tubing shaped into a loop to which the inflatable band is attached. The outlet nipple or nipples are preferably situated at this loop for convenient communication with the inflatable band attached thereto.

When the unitary seat belt containing the pressure chamber is inserted into a buckle and latched thereto, electrical connections are simultaneously made between the conductors in the tongue and conductors in the buckle, said electrical connections being readily broken with the release and disengagement of the tongue from the buckle.

The conductors in the buckle are in an electric circuit which includes a source of electrical energy, usually the service battery of the vehicle, and a sensor adapted for closing a circuit when subjected to abnormal conditions which tend to violently displace an individual in the vehicle from his seat. When the tongue is engaged with the buckle therefore, and the conductors in the tongue are electrically connected to the conductors in the buckle, the source of pressurized gas, or more specifically the means for releasing the gas on receipt of an electric impulse, is brought into the circuit. If now the sensor responds to an abnormal condition, such as a selected force which develops in the vehicle as the result of a collision, for example, abnormally rapid deceleration, the sensor transmits an electric impulse to the means for releasing the gas, and the inflatable band is inflated. If an electrically triggered squib is the means, the heat generated by the combustion raises the pressure of the pressurized gas above the rupture point of the rupturable disc or partition, and the gas escapes through the conduit to the band to inflate it.

In addition to the effect of the heat, additional gas also results from the combustion of the charge in the squib, to add to the pressure and final volume of the available gas. An important advantage of the system of the present invention resides in the fact that the pressurized gas, except for the restraint of the rupture disc, is at all times in direct communication with the inflatable band. No connections need be made, the inserting of the tongue is rapid and free of the need for critical alignment of conduit, and the danger of leakage of the gas is virtually eliminated.

The circuit which includes the means for releasing the gas, the sensing device, and the source of electrical energy, can, if desired, be tied into secondary circuits for alerting the driver if he, or one of his passengers, has failed to buckle up. If a circuit which includes the same source of energy, an ignition switch, or one operating in conjunction with it, a weight-sensitive seat switch to open the circuit if the seat is unoccupied, and an electrically operated signal device, such as a dash board light, also contains a magnetically controlled two-position switch, biased in its closed position, then the signal may automatically be turned off when the band is properly positioned about an individual. This action may be achieved by still another circuit, using the same source of electrical energy, which is opened or closed by the engagement and disengagement of one cooperating pair of conductors, providing there is also included in the circuit an electromagnet or a solenoid which opens the two-position, magnetically controlled switch included in the first of the secondary circuits described. When the tongue is inserted into the buckle, the magnet is energized, moving the two position switch to its off position, and shutting off the signal.

The vehicle inflatable band assembly and its operation may be better understood by referring to the attached drawings wherein like numerals refer to like or corresponding parts throughout the several views.

Figure 13:
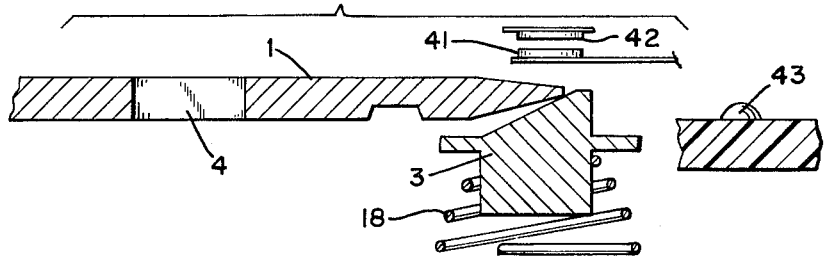
FIG. 13 is a view in cross-section of a switch, urged to the closed position by the latch when fully extended, which may be used singly, or in combination with a second similar switch, for disconnecting the contacts of FIGS. 11 and 12 until the tongue is latched, and the terminal contacts of FIG. 10 are in physical contact with the biased contacts of FIGS. 11 and 12. Ordinarily this switch would be superfluous, but could have value in the circumstance where the circuit includes a signal device and it is desired to avoid momentarily grounding the circuit when the tongue is inserted into the buckle, for unless the tongue has an undersurface protected by an insulator, such as a plastic film or coating, the contacts of FIGS. 11 and 12 are momentarily connected through the tongue during the moment of its insertion into the buckle.

In the cross-sectional view of FIG. 1, numeral 1 is a unitary tongue in locked engagement with buckle 2. Inclined latching member 3 has been urged upwardly into opening 4 by biasing spring 5 (FIG. 13). Preferably the belt is anchored to the vehicle by means of slot 6. Tongue 1 includes compartment 7 for accepting pressure chamber 8.

In assemblying the source of pressurized gas, squib 13 is screwed into a threaded opening in the bottom of the pressure chamber, 14, with rigid leads 15 extending outwardly from the bottom.

Gasket or O-ring 16 is placed in the cover 17 of the pressure chamber 8, followed by a rupture disc 12 selected for rupture at the desired pressure. Rupture disc retainer 19 is then screwed into the underside of cover 17 of the pressure chamber to tightly position the rupture disc 12. The assembled cover 17 is now screwed into pressure chamber 8.

The pressure chamber is charged with a gas under high pressure, such as argon, using conventional means, as through a ball check valve, in a separate opening now shown. In the preferred embodiment the gas-filled pressure chamber is inserted into compartment 7, with projecting leads 15 engaging electric recepticals 23 in the bottom of the compartment, thus connecting the squib with conductors 24. Compartment 7 is closed after inserting pressure chamber 8 by screwing in closure 9. Conduit 10 is in communication with compartment 7, and with the source of pressurized gas in the pressure chamber 8, except for the gas-retaining rupture disc 12. Cover 17 has a central raised portion 20 having openings 22 around its periphery for the escape of gas, once rupture disc 12 has been ruptured, as a result of the discharge or detonation of heat-producing squib 13. When closure 9 is screwed into the compartment to completely enclose pressure chamber 8, its underside preferably becomes contiguous with the raised portion 20 of the pressure chamber cover 17, to hold the chamber firmly within compartment 7 of the tongue.

Conduit 10 forms a loop for the attachment of inflatable band 25 and has one or more nipples 26 for connection with the inflatable band.

When the tongue is inserted in buckle 2, conductors 27 (FIG. 14) within the buckle (in a circuit which includes service battery 28 (FIG. 14) and sensor 29 (FIG. 14) responsive to selected forces which develop within a vehicle when in collision), make electrical contact with conductors 24. Several different ways in which these contacts may be made are illustrated in FIGS. 7, 8, 9, 10, 11 and 12. It follows, therefore, that when the tongue is so engaged, and an electrical impulse is transmitted to squib 13, it detonates, heating the pressurized gas, and raising the pressure above the bursting point of rupture disc 12. The gas then is released through passageway 30 and conduit 10 to nipples 26 whereupon it escapes into inflatable band 25 and inflates it.

Figure 2:
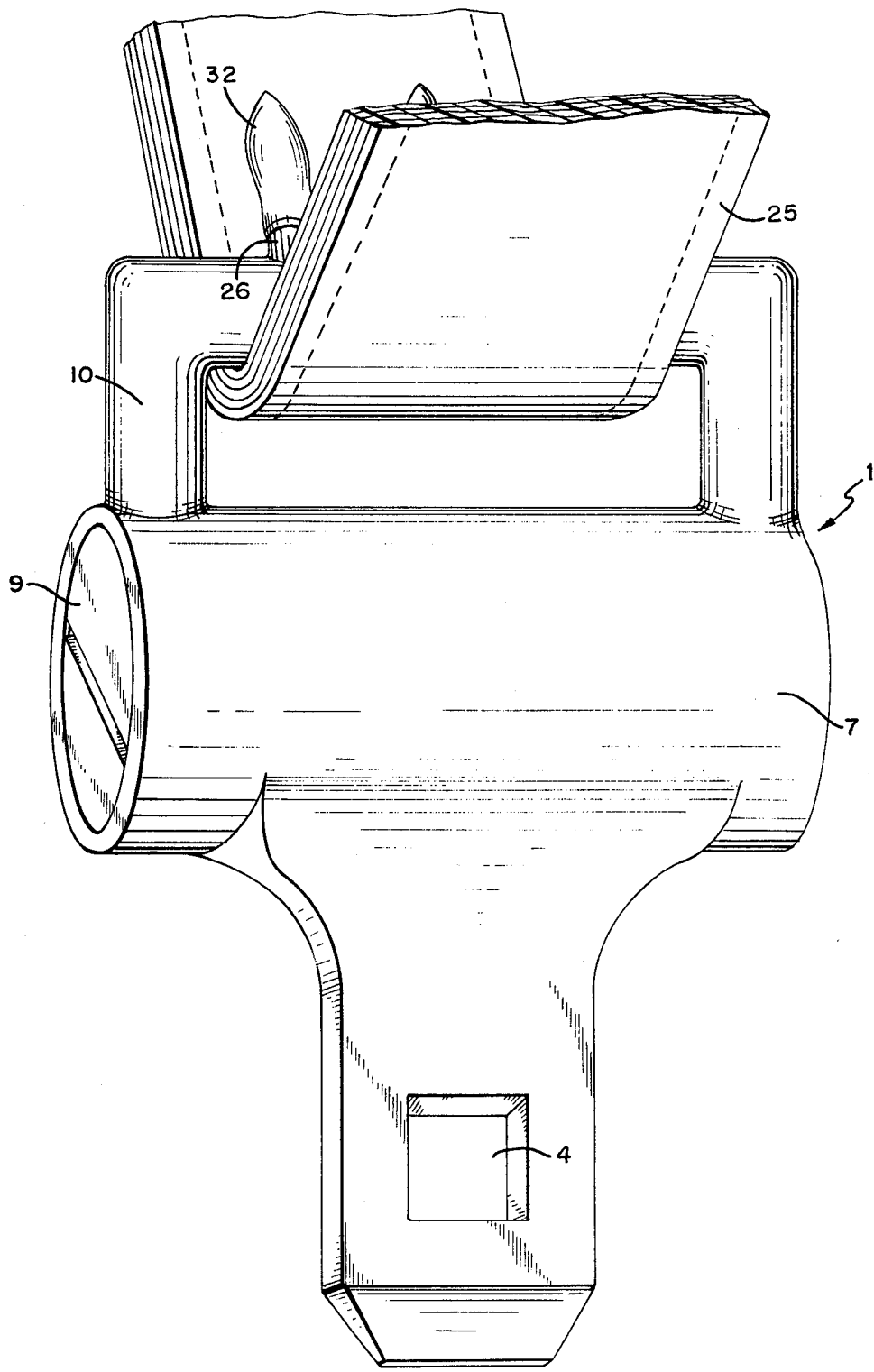
FIG. 2 is an enlarged view in perspective of the unitary tongue of FIG. 1.

FIG. 2 is a perspective drawing of the unitary tongue of FIG. 1. The source of gas is enclosed within compartment 7 which is an integral part of tongue 1. Closure 9 has been screwed in place, securing the pressure chamber within. Nipple 26 in communication with conduit 10, is sealed into inflatable belt 25 at point 32. Opening 4 is positioned for engagement with the latching member 3 of buckle 2 shown in FIG. 1. The type of latching device is not critical. The type of buckle is also not critical, except that it is to include conductors and electrical contact surfaces for electrical connection with conductors 24 of the tongue (FIG. 1).

Figure 3:
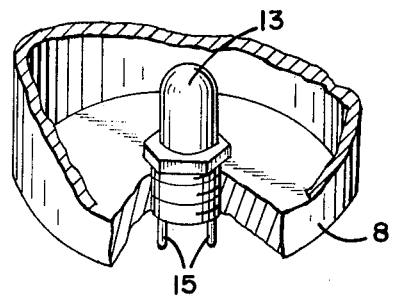
FIG. 3 is an enlarged, partial, break-away view in perspective of the lower portion of the pressure chamber, and the means for releasing the pressurized gas, which together, comprise the source of pressurized gas. In this illustration, the means for releasing the gas is an electrically triggered pyrotechnic device, or squib, having two electrical leads which extend from the bottom of the pressure chamber.

FIG. 3 is an enlarged break-away section of the bottom of the pressure chamber of FIG. 1 in perspective. Squib 13 is shown as screwed into the bottom of the chamber, with its rigid electrical leads extending to form a two-prong electrical plug 15.

Figure 4:
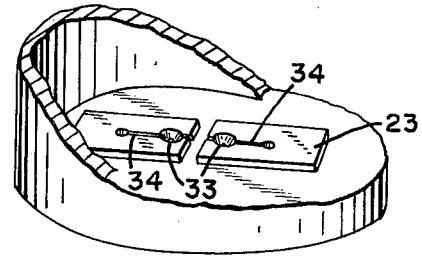
FIG. 4 is an enlarged partial break-away view in perspective of the lower part of the compartment, integrated with the tongue, for receiving the source of pressurized gas of FIG. 3. In this embodiment, the electrical leads extending from the bottom of the pressure chamber of FIG. 3, plug into corresponding recepticals comprising an electric socket, to thereby place the pyrotechnic device of the source of pressurized gas into electric contact with the conductors within the tongue.

FIG. 4 is an enlarged break-away section of the bottom of the compartment 7 which is an integral part of the tongue 1 (FIG. 1) and receives pressure chamber 8. One type of electrical receptical 23 is shown which connects with the two conductors 24 (FIG. 1) in the tongue. As shown, the recepticals consist of two flat spring-metal members, preferably of spring brass or phosphor-bronze. They contain conical openings 33 for guiding and engaging leads 15 into good electrical contact therewith. Slots 34 which extend through openings 33 to the near edge of the flat members permit openings 33 to expand, by slightly spreading the bifurcated members, thus firmly gripping leads 15. The pressure chamber can therefore be plugged into the compartment, making electric contact with the conductors, and removed from the compartment at will, simultaneously withdrawing the two-prong plug from the recepticals 23.

Figure 5:
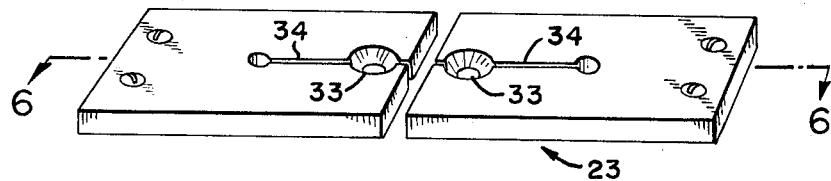
FIG. 5 is an enlarged perspective view of the recepticals of FIG. 4.
Figure 6:
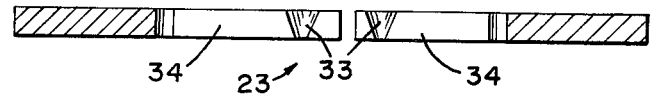
FIG. 6 is an enlarged cross-sectional view of the recepticals of FIG. 5.

FIGS. 5 and 6 further detail the receptical 23 of FIGS. 3 and 4, FIG. 5 being in perspective, and FIG. 6 a cross-section taken through line 5—5 of FIG. 5.

Figure 7:
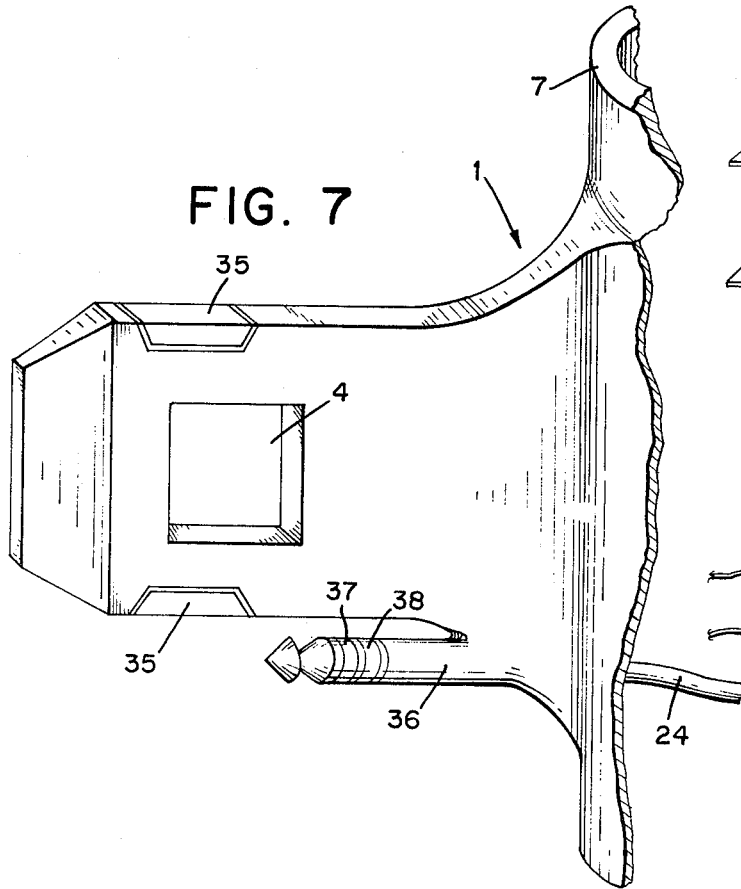
FIG. 7 is an enlarged partial view in perspective of that portion of the tongue which engages the buckle. Two different methods of terminating the conductors from the means for releasing the pressurized gas are shown. One method involves the use of a protruding plug having two segments on its surface for electrical contact with a receptical. The other method shown comprises insulated segments inlaid in the edge of the tongue for contacting biased electric contacts within the buckle.

FIG. 7 is a perspective view of a portion of the tongue of FIGS. 1 and 2, showing in one drawing, two different ways in which the connectors may be terminated to form electrical contact surfaces for cooperation with mating surfaces within the buckle housing. One method involves contact surfaces 35 inlaid in the edge of the tongue, and electrically insulated therefrom, with each surface comprising the terminal of a conductor 24 leading to a receptical for a prong 15 of the squib 13 as shown in FIGS. 1 and 4. A second method, shown in the same drawing, is an extending plug 36 having two segments, 37 and 38, insulated from each other, and from the body of the plug, but connected to the recepticals 23 for receiving the leads 15 from the squib. Conductors 24 from the plug are shown extending from the section, for connection with the recepticals 23. Alternately, two plugs may be used, one extending from one side and one from the other, each being in electric contact with a different receptical.

Figure 8:
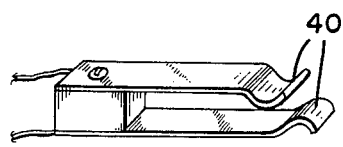
FIG. 8 illustrates in perspective, one form of electric jack for receiving a plug of the type shown extending from the tongue of FIG. 7. Such a jack would be included within the buckle housing.

FIG. 8 is a perspective drawing of one type of electrical jack 39 which may be installed in the housing of buckle 2 for engaging a plug such as that of numeral 36 (FIG. 7). Because of the off-set of the biased contacting members 40 one contacts a first segment 37 and the other, the second segment 38 (FIG. 7).

Figure 9:
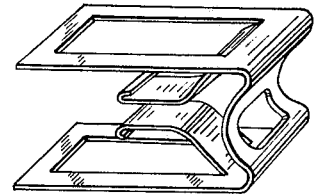
FIG. 9 illustrates in persepctive another form of jack, stamped from one piece of spring metal, for positioning within a buckle housing. This jack differs from that of FIG. 8 in that it shorts both segments of the plug, and is only of value when all of the circuit involved is included in the tongue and band assembly, and none, beyond the jack, in the buckle.

FIG. 9 is a perspective drawing of another type of jack which may be stamped from a single piece of spring metal. It is adapted, however, for simultaneously short circuiting both segments of a plug such as 36 of FIG. 7, and would only be appropriate when the source of electrical energy and the sensing device are placed in a circuit with the squib, which would then be armed by inserting the tongue into the buckle. The jack is adapted for fitting within a rectangular recess in the body of the buckle, and provides some funneling, for easy insertion of the plug.

Figure 10:
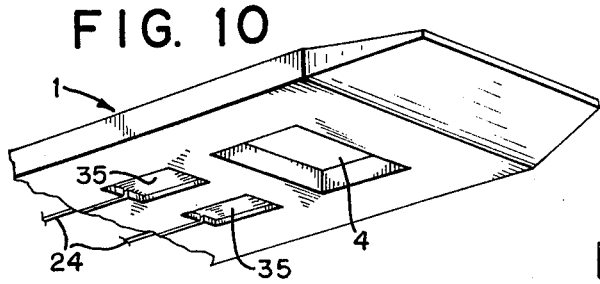
FIG. 10 is an enlarged partial view in perspective, of a tongue having the two electric contacts which are the terminals of the conductors from the means for releasing the pressurized gas, inlaid and preferably recessed in the plane surface, preferably the under surface, of the tongue.

FIG. 10 is a perspective view of a section of the under-surface of the tongue of FIGS. 1 and 2, illustrating still another method of terminating the conductors in the tongue for electrical engagement with contact surfaces within the buckle housing. Here the terminals 35 are inlaid in the under plane surface of the tongue and are preferably slightly recessed. Conductors 24 as before, are connected to the recepticals 23 for the leads 15 from the squib.

Figure 11:
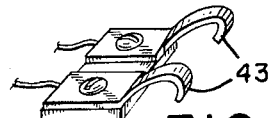
FIG. 11 illustrates in perspective, a pair of biased contacts of a type which may be housed within the buckle for engaging the terminals of FIG. 10.
Figure 12:
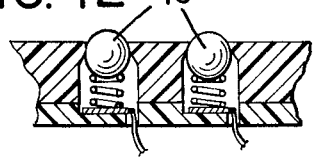
FIG. 12 illustrates in enlarged cross-section, spherical spring-biased contacts as another variation of biased contacts for engaging the inlaid terminals of FIG. 10.

FIGS. 11 and 12 represent two ways in which contacts 43 may be adapted for installation within the buckle housing for contacting terminals 35 of FIG. 10. FIG. 11 shows two biased spring contacts 43 in perspective, each insulated from the other, but connected into the circuit with the battery and sensing device. In FIG. 12, ball contacts 43 are shown in cross-section, spring-biased toward the tongue. As with the contacts of FIG. 11, they are insulated from each other and included in the circuit with the battery and sensing device. It should be noted that if the battery and sensing element are placed in the circuit with the squib, then the two contacts may be electrically connected, thus arming the circuit when the tongue is engaged with the buckle.

FIG. 13: It will occur to those skilled in the art that when contacts 43 such as those shown in FIGS. 11 and 12 are drawn across the surface of a metal tongue, they will be momentarily short circuited until the tongue is fully engaged in the buckle. Ordinarily this is not significant for there is no source of energy in the circuit, assuming that only the squib is included, which is the preferred arrangement. Even if the battery and sensor are included in the circuit, it would still make no difference, as the sensor would maintain the circuit in its open position. If, however, it is desired to avoid this momentary short circuiting of the leads, without the necessity of protecting the under-surface of the tongue with a non-conductive coating or film, it may be accomplished by employing within the buckle, a two position switch biased in its open position as shown in FIG. 9, interrupting the electrical path of one of the conductors in the buckle. If desired, two such switches may be employed, each interrupting the electrical path of one of the two conductors. When the buckle is not engaged with the tongue, inclined latch member 3, urged upwardly by spring 18, presses contact 41 into contact with 42. When the tongue is inserted, and before the contacts 43 of FIGS. 11, 12 and 13 contact the tongue, the latch member 3 is depressed, allowing contact points 41 and 42 to separate. These remain separated until the opening 4 reaches the latch, and simultaneously contacts 43 reach contact terminals 35. The latch then springs upwardly within opening 4, locking the tongue in the belt and closing the switch of FIG. 13.

Figure 14:
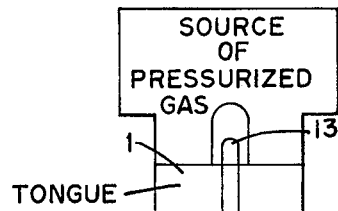
FIG. 14 is a diagrammatic representation of the circuit, illustrating that when the tongue, integrated with the source of pressurized gas is inserted into the buckle, the electrically activatable means for releasing the pressurized gas is placed into the circuit with the source of electrical energy (service battery), and the sensing device. It follows that only when the tongue is latched with the buckle, can the sensing device send an electric impulse to the means for releasing the pressurized gas (electrically activatable squib).

FIG. 14 is a diagrammatic representation of the primary circuit which includes the means 13, for releasing the pressurized gas in the pressure chamber, the source of electrical energy 28 (service battery) and the sensor 29. This circuit is armed when tongue 1 is engaged with buckle 2, bringing conductors 24 of the tongue and conductors 27 of the buckle into electrical contact. When sensor 29 closes the circuit in response to conditions such as those which develop at the time of a collision, electric current from battery 28 detonates squib 13 and rupture disc 12 bursts because of the increase in gas pressure with temperature. The gas then inflates the inflatable band. This circuit is tied in with a secondary circuit, the battery being common to both. This secondary circuit includes in addition to the battery, a signal device such as a dashboard warning light 44, and a two-position, magnetically operated, electric switch 45, biased in the closed position. Preferably, the circuit also includes the ignition switch 46 or a switch acting in conjunction with the ignition switch, and a weight-sensitive seat switch 47 which is in its closed position only when the seat is occupied. Resistance 48 may be included in the circuit if desired. When the ignition switch is on, and the seat is occupied, signal device 44 is active. There is, however, another secondary circuit to which the battery is also common. This includes in addition to the battery, one mating pair of contacts 24 and 27, one in the tongue and one in the buckle 2, and also an electromagnet 50 which opens the two-position switch 45 when activated, by attracting an armature 49 attached to a movable switch point.

It is clear that when the tongue is not engaged in the buckle, the individual is seated but does not have the inflatable band positioned about him, and the ignition switch is on, the signal is active, indicating that the inflatable band is not positioned about the individual. When he inserts the tongue in the buckle, however, the circuit to the electromagnet is closed by virtue of the connection between conductors 24 and 27, the magnet opens switch 45 and the warning signal is deactivated.

While I have described the preferred embodiment of my invention, it will be understood that various modifications and changes can be made in the vehicle safety restraint described without departing from the spirit of the invention or the scope of the following claims.

I claim:

1. A vehicle inflatable band assembly having a fastening device for positioning the band about an individual, comprising a rigid, unitary tongue attached to the inflatable band, a buckle for lockable engagement with said tongue, a chamber located in said tongue containing a source of pressurized gas in communication with the inflatable band, a rupturable partition separating said chamber from said band; a source of electrical energy for producing an electrical impulse; said source of pressurized gas including means responsive to the electrical impulse for rupturing the partition releasing the gas to the inflatable band, said tongue having electrical conductors connected to the means responsive to an electrical impulse, conductors on said buckle for contacting said tongue conductors when said tongue and buckle are in lockable engagement, said buckle conductors being in an electrical circuit including said source of electrical energy, and a sensing element for completing said electrical circuit in response to certain deceleration conditions of the vehicle whereby the safety band is inflated only when said tongue and buckle are in lockable engagement and said sensing element has been actuated.

2. The vehicle inflatable band assembly of claim 1 wherein the means responsive to an electrical impulse for releasing the pressurized gas to the inflatable band comprises an electrical detonatable pyrotechnic device.

3. The vehicle inflatable band assembly of claim 2 wherein said tongue conductors terminate in at least one recessed electrical receptical and said buckle conductors comprise extending members in the buckle.

4. The vehicle inflatable band assembly of claim 2 wherein said tongue conductors comprise insulated segments in the edge of the tongue, said segments making sliding contact with said buckle contacts within the buckle housing.

5. The vehicle inflatable band assembly of claim 2 wherein said tongue conductors comprise insulated contact areas inlaid in the plane surface of the tongue said contact areas making electrical contact with said buckle contacts within the buckle housing, said buckle contacts being biased toward the plane surface of the tongue containing the inlaid contact areas.

6. The vehicle inflatable band assembly of claim 5 wherein the inlaid contact areas are recessed beneath the plane surface of the tongue.

* * * * *